United States Patent [19]
Benderovsky et al.

[11] 3,785,589
[45] Jan. 15, 1974

[54] MECHANISM FOR TRANSPORTATION OF AN INFORMATION CARRIER AT RESPECTIVELY DIFFERENT SPEEDS

[76] Inventors: Vladimir Valerianovich Benderovsky, ulitsa Dymerskaya, 37, kv. 1; Alexandr Ivanovich Schepotiev, Brest-Litovsky prospekt, 112, kv. 39; Igor Alexandrovich Yastrebov, 52 Delegatsky pereulik, 10, kv. 1; Viktoria Mikhailovna Kotenko, Brest-Litovsky prospekt, 19, kv. 27, all of Kiev, U.S.S.R.

[22] Filed: July 29, 1971

[21] Appl. No.: 167,122

[52] U.S. Cl. .................................. 242/201, 74/713
[51] Int. Cl. ......................... B11b 15/32, G03b 1/04
[58] Field of Search ........................... 242/179, 210; 274/4 D, 11 D; 74/677, 681, 713

[56] References Cited

UNITED STATES PATENTS

| | | | |
|---|---|---|---|
| 3,302,901 | 2/1967 | Young et al. | 242/201 |
| 2,989,260 | 6/1961 | Panissidi | 242/185 |

*Primary Examiner*—Leonard D. Christian
*Attorney*—Eric H. Waters et al.

[57] ABSTRACT

A mechanism for transportation of an information carrier from a supply reel onto a take-up reel by means of a driving motor adapted to be drivingly connected with the take-up reel through at least two independent transmissions having different transmission ratios. One transmission includes a pair of bevel gears and the other includes a worm and worm gear, and actuation of one transmission with con-current deactivation of the other is effected by a displaceable bracket member.

4 Claims, 1 Drawing Figure

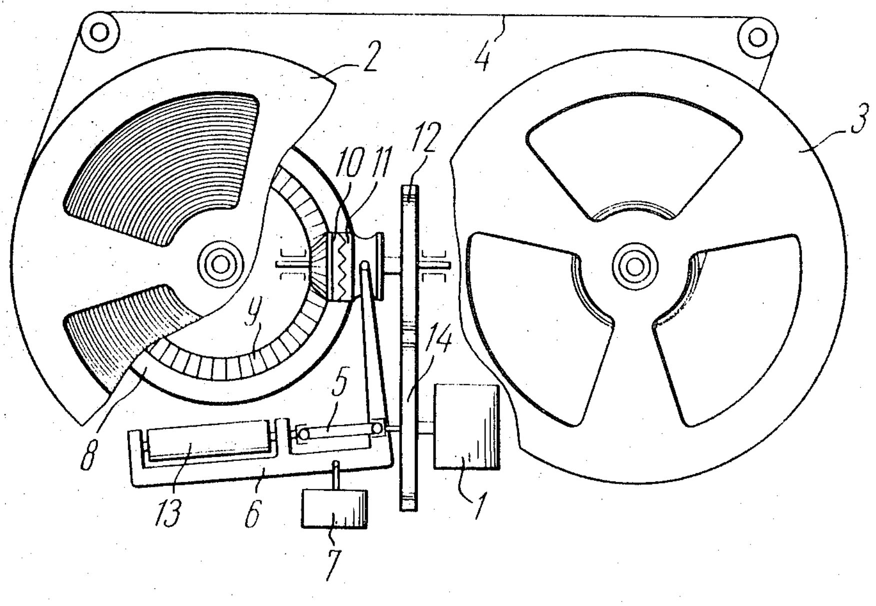
2
4
3
12
10
11
9
14
5
8
13
6
1
7

MECHANISM FOR TRANSPORTATION OF AN INFORMATION CARRIER AT RESPECTIVELY DIFFERENT SPEEDS

The present invention relates to information handling means and, more particularly, to apparatus for recording information, incorporated into various inspection, control and registration systems. Still more precisely, the invention relates to mechanisms for transportation of an information carrier.

The invention can be employed in apparatus for transportation of, for example, magnetic tape or band, wire etc., incorporated in the magnetic recording devices belonging to systems of registration and automatic control associated with vehicles of various kinds, to program process control systems, to program-controlled machine tools, to the memories of computers, and so on.

The present invention can be employed, however, to an utmost advantage in apparatus wherein it is essential that the information recording time should be relatively great, whereas the playback time of the recorded information should be substantially shorter than the recording time, for instance, in the registration devices of aircraft, where information is to be recorded throughout a flight, whereafter it is to be re-recorded into a "land" information handling apparatus many times swifter than it had been recorded.

On the other hand, in the case of program-controlled production processes, a program preferably is to be recorded within a minimum time, whereas the playback of the program is to be extended over a considerable period.

The desired to extend the range of the speeds of transportation of an information carrier results in complication of the structure of the recording apparatus, in incorporation therein of either two or more driving motors, which, in its turn, brings about increased size and weight of the mechanisms and affects the reliability of their performance. There are known, however, mechanisms for transportation of an information carrier that offer either two or more transportation speeds and incorporate a single driving motor, but in these mechanisms the ratio of the lowest transportation speed to the highest one is practically not greater than 1:5 to 1:8.

Additionally, in the mechanisms incorporating an electric driving motor, the variation of the transportation speed of the information carrier can be achieved only in steps, e.g., two times, four times, etc.

However, in order to select an optimal cutting operation for a program-controlled metal working machine tool, it is more desirable to employ mechanisms with continuously variable information carrier transportation speed.

In the known mechanism for transportation of an information carrier, incorporated in the magnetic recording apparatus mounted on board aircraft, such as Models 750 to 8000 (see catalogues of the "SES" Company, "Dala-Slor" Chicago Division), an increased speed of transportation of the information carrier in one direction only is attained by feeding an increased voltage to the electric driving motor.

The last-mentioned known mechanism includes two reels, or spools adapted to support thereon the information carrier and further means for tensioning the information carrier, connected to at least one of the two reels, and a driving electric motor effecting transportation of the information carrier from one of the reels onto the other one.

This mechanism has a number of disadvantages.

The main disadvantage of this mechanism is that it does not provide a substantial increase in the speed of transportation of the information carrier in the "high-speed" fashion of its operation relative to its normal mode of operation, because this increase is attained by variation of the supply voltage of the driving motor. An attempt to increase the "high-speed" relative to the "normal" speed in the order of 20 to 25 times and more, results in a considerable growth of the size and weight of the driving motor, and, consequently, of the mechanism as a whole, as well as of the amount of power consumed by the mechanism. It should be noted that in this mechanism "high-speed" transportation is possible in one direction only.

The known mechanism puts a certain limit to the use therein of metal magnetic bands, on account of the dry friction between the band path elements, including that between the magnetic heads and the band. An attempt to lower the friction by lubricating the band path elements with liquid results in the increased possibility that the magnetic band might start slipping in respect of the driving spindle, and thus affects the overall reliability of the performance of the mechanism.

Besides, the known apparatus cannot be used with wire-type information carriers. This fact narrows still more the scope of the feasible practical applications of the mechanisms of the above type, particularly, when the mechanisms are to be operated under intense operating conditions.

It is an object of the present invention to avoid these disadvantages.

The present invention has for its aim the provision of a mechanism for transportation of an information carrier, which offers a wide range of the variation of the information carrier transportation speed, while the amount of external power supplied to the mechanism is practically constant.

This aim is attained in a mechanism for transportation of an information carrier from one reel onto another reel with the help of a driving motor and means for tensioning said information carrier, in which mechanism, in accordance with the present invention, said driving motor is a hydraulic one and is operatively connected with the other one of said two reels by means of at least two independent driving paths having substantially different respective transmission ratios, said paths being associated with said driving motor and being selectively completed to drive said other reel, so that when one of said driving paths is engaged to drive said other reel, the other one of said driving paths is disengaged from said other reel.

In one embodiment of the present invention, one of said two driving paths includes a worm gear couple and the other one of said two driving paths includes a bevel gear couple, the worm of said worm gear couple being mounted on a movable bracket displaceable between two fixed working positions, said worm being operatively connected with said driving hydraulic motor through a universal joint coupling, the driving bevel gear of said bevel gear couple being operatively connected with said driving motor through a selectively disengageable coupling operatively associated with said movable bracket, so that said bracket in one of said two fixed working positions thereof effects engagement into operation of said bevel gear couple through said selectively disengageable coupling and disengagement of said worm gear couple, said bracket in the other one of said two fixed working position thereof effecting engagement of said worm gear couple and disengagement of said bevel gear couple through said selectively disengageable coupling.

It is preferable that said movable bracket be associated with an actuating device adapted to selectively displace said bracket into either one of said two fixed working positions thereof.

A mechanism constructed in accordance with the invention may be enclosed within a hermetically sealed housing filled with liquid.

The present invention will be further described in connection with an embodiment thereof, with references being had to the accompanying drawing the sole FIGURE of which illustrates, the functional driving diagram of a mechanism constructed in accordance with the invention in elevation view and partly broken away.

Referring now in particular to the appended drawing, the mechanism for transportation of an information carrier incorporates a hydraulic driving motor 1 and two spools, or reels, viz., the take-up reel 2 and the supply reel 3 on which the information carrier 4 can be wound; means for tensioning the information carrier (not shown in the drawing), a worm gear couple, a bevel gear couple, a universal joint coupling 5, a pivotable bracket 6 and an actuator 7. The take-up reel 2 is operatively connected with the supply reel 3 through the information carrier 4. Non-rotatively rigidly mounted on the spindle of the take-up reel 2 are the toothed worm wheel 8 of the worm gear couple and the driven gear 9 of the bevel gear couple. The driving gear of the bevel gear couple is in permanent engagement with the driven gear 9 and is made integral with half-coupling 10 of a clutch formed by half-couplings 10, 11.

The other half-coupling 11 of the clutch, is movable and, is mounted for axial displacement on a spline shaft by which it is non-rotatively connected with a first toothed wheel 12. The half-coupling 11 is also operatively coupled to the pivotable bracket 6. Journalled for rotation on the pivotable bracket 6 is a worm 13 which is connected through the universal joint coupling 5 with second toothed wheel 14 meshing with the first toothed wheel 12.

The second toothed wheel 14 is rigidly mounted on the shaft of the driving hydraulic motor 1. The movable pivotable bracket 6 is operatively coupled to the actuator 7 which can selectively displace the pivotable bracket to either of one of the two fixed positions thereof.

The entire mechanism can be enclosed within a housing (not shown in the drawing), the housing being hermetically sealed and filled with liquid, e.g., with the working liquid of the hydraulic motor 1.

The operation of the herein disclosed mechanism for transportation of the information carrier is as follows.

When the mechanism is actuated for operation, the working liquid is fed from a suitable source of the working liquid under pressure (not shown) to effect rotation of the driving hydraulic motor 1.

The pivotable bracket 6 is in one of the two fixed working positions thereof, completing the respective one of the two possible driving paths. For example, when the information carrier 4 is to be transported at the "low" speed, the worm gear couple is brought into engagement. This being the case, the driving motor 1 transmits rotation through the universal joint coupling 5 to the worm 13 which drives the worm wheel 8 of the worm gear couple. In this way transportation of the information carrier 4 at the "low" speed is effected. Meanwhile, the movable half-coupling 11 is freely rotating on account of the meshing engagement of the first and second toothed wheels 12 and 14, but it is spaced from the other half-coupling 10 and does not transmit rotation to the driving gear of the bevel gear couple.

Should the need arise to effect transportation of the information carrier 4 at the "high" speed, the actuator 7 is operated to displace the pivotable bracket 6 into the other one of the two fixed working positions thereof, whereby the worm 13 is disengaged from the worm wheel 8, and the half couplings 10 and 11 are engaged to transmit rotation through the bevel gear couple, whose transmission ratio is lower than that of the worm gear couple. In this case rotation is transmitted from the driving motor 1 to the take-up reel 2 through the toothed wheel 14, the toothed wheel 17 and through the now engaged half-couplings 10, and 11 of the clutch. In this way the different transmission ratios of the bevel gear couple and of the worm gear couple, respectively serving as independent transmissions between the drive motor and the take-up reel, are employed to effect transportation of the information carrier 4 selectively at two different speeds.

In order to obtain automatic control over the displacement of the pivotable bracket 6 between the two working positions thereof, the bracket is associated with an actuator 7 which may be hydraulic, electrically operated, air operated, etc.

Thus, it can be seen that in the herein disclosed mechanism a minimal amount of the components of the driving chain provides for effecting transportation of the information carrier 4 selectively at two substantially different speeds, this being attained also because the herein disclosed mechanism incorporates the hydrualic driving motor.

The practical employment of a mechanism for transportation of an information carrier, makes it possible to widen considerably the field of application of the magnetic recording apparatus.

With the mechanism offering a selection of two substantially different transportation speeds, on account of its incorporating the hydraulic driving motor and two driving paths with different transmission ratios, it can be used to utmost advantage in the systems of registration of the flight data of aircraft, as well as on other vehicles.

Moreover, the possibility to select an optimal speed of transportation of the information carrier, brought about by the incorporation of the hydraulic driving motor, makes it possible to select the optimal operational conditions in program control systems of various kinds, e.g., the optimal cutting speeds in program-controlled metal-working machine tools.

When the mechanism is enclosed in a liquid-filled housing, it is perfectly capable of using metal magnetic tapes, or bands and metal wire as the information carrier, the metal bands and wire featuring high physical, thermal and other valuable characteristics.

A mechanism for transportation of an information carrier of the present invention combines small size and weight with a great memory capacity and consumes but a minimal amount of external power.

What is claimed is:

1. A mechanism for transportation of an information carrier comprising: a supply reel from which the information carrier is unwound in the course of operation of the mechanism and a take-up reel onto which the information carrier is wound, a hydraulic driving motor, a drive means on said take-up reel, first and second independent transmissions with substantially different transmission ratios between said driving motor and the drive means on said take-up reel, and actuator means connected to both the first and second transmissions for selectively engaging one or the other of the first or second transmissions with the drive means on the take-up reel, the nection of the actuator means to the first and second transmissions being such that when one transmission is coupled to the drive means the other transmission is uncoupled and rendered inoperative.

2. A mechanism as claimed in claim 1 wherein said first transmission and drive means comprises a worm gear arrangement including a worm and a worm gear, the second transmission and drive means including a pair of bevel gears, a universal joint connecting said hydraulic motor and said worm, said actuator means comprising a bracket member supported for displacement between first and second positions, said worm being mounted on the bracket member and a clutch between said driving motor and said bevel gears, said bracket member being coupled to said clutch to open the same and disconnect the drive motor and the bevel gears in one position of the bracket member while concurrently engaging the worm and worm gear, said bracket member in the other position closing said clutch to establish drive from the motor to said bevel gears while concurrently separating the worm from the worm gear.

3. A mechanism as claimed in claim 2 wherein said actuator means includes an actuator element coupled to said bracket member to displace the same between said first and second positions.

4. A mechanism as claimed in claim 2 wherein said drive means is constituted by one of said bevel gears and said worm gear.

* * * * *